United States Patent [19]

Decker et al.

[11] Patent Number: 5,957,575
[45] Date of Patent: Sep. 28, 1999

[54] REFLECTING ILLUMINATION DEVICE FOR AN INTERIOR SPACE OF A MOTOR VEHICLE

[75] Inventors: Detlef Decker; Burkhard Woerdenweber, both of Lippstadt, Germany

[73] Assignee: Hella KG Hueck & Co., Lippstadt, Germany

[21] Appl. No.: 08/883,352

[22] Filed: Jun. 26, 1997

[30] Foreign Application Priority Data

Jun. 29, 1996 [DE] Germany ............... 196 26 172

[51] Int. Cl.$^6$ ........................................ B60Q 1/26
[52] U.S. Cl. ............... 362/488; 362/147; 362/281; 362/282; 362/283; 362/284; 362/298; 362/322; 362/324; 362/346; 362/490; 362/509; 362/514
[58] Field of Search ............... 362/147, 281, 362/282, 283, 284, 298, 322, 324, 488, 490, 509, 346, 514

[56] References Cited

U.S. PATENT DOCUMENTS

| | | | |
|---|---|---|---|
| 1,813,102 | 4/1931 | Vogel | 362/346 |
| 1,935,045 | 9/1933 | Doane | 362/346 |
| 4,028,542 | 6/1977 | McReynolds, Jr. | 362/346 |
| 4,231,080 | 10/1980 | Compton | 362/346 |
| 5,006,966 | 4/1991 | Mikalonis . | |

FOREIGN PATENT DOCUMENTS

| | | |
|---|---|---|
| 602 523 | 6/1933 | Germany . |
| 94 07 107 U | 11/1994 | Germany . |
| 44 06 458 | 8/1995 | Germany . |
| 63-162019 | 1/1990 | Japan . |

OTHER PUBLICATIONS

Patent Abstracts of Japan, JP2–11431, Jan. 1, 1990.

Primary Examiner—Sandra O'Shea
Assistant Examiner—John A. Ward
Attorney, Agent, or Firm—Griffin, Butler, Whisenhunt & Szipl, LLP

[57] ABSTRACT

An illumination device for an interior space, such as that of a motor vehicle, for example, has a light source (2) and an opposing reflector system (3) located at a distance across the interior space, wherein the reflector system includes a reflector unit having multiple reflectors (8, 13, 14, 15, 16) each capable of being brought into a position in a beam path (7) of light from the light source (2). The light source (2) can be placed in a center control panel (4) of the motor vehicle, while the reflector system (3) can be placed on a vehicle ceiling located opposite the center control panel (4).

28 Claims, 3 Drawing Sheets

REFLECTING ILLUMINATION DEVICE FOR AN INTERIOR SPACE OF A MOTOR VEHICLE

BACKGROUND OF THE INVENTION

This invention concerns an illumination device for an interior space, such as that of a motor vehicle for example, having a light source and an opposing reflector located a distance from the light source across the interior space therefrom.

German patent document (DE-602 523) discloses an illumination device for an interior space of a motor vehicle. A light source which emits light beams essentially only in a horizontal direction is placed in an upper part of the interior space with the beams from the light source being deflected downwardly by an inclined or arched wall section connecting a sidewall to a roof and acting as a reflector. A disadvantage of such a wall section designed as a reflector is that, on the one hand, it is unchangeable and generates only diffused light, and on the other hand, it defines a geometry of the interior space.

German patent document (DE-44 06 458) discloses an illumination device for indirectly lighting of a space. Light beams from a light source located in the space strike a suspended reflector at a sharp angle and are diverted into the space. A disadvantage of this illumination device, as well, is that it is unsuitable for performing multiple functions.

It is an object of this invention to provide an illumination device which can be used for multiple functions requiring multiple light bundles, that is, multiple light distributions.

SUMMARY

According to principles of this invention, a reflector system includes a reflector unit having a plurality of reflectors, each for being brought into a beam path of a light source.

BRIEF DESCRIPTION OF THE DRAWING

The invention is described and explained in more detail below using embodiments shown in the drawings. The described and drawn features, in other embodiments of the invention, can be used individually or in preferred combinations. The foregoing and other objects, features and advantages of the invention will be apparent from the following more particular description of a preferred embodiment of the invention, as illustrated in the drawings in which reference characters refer to the same parts throughout the different views. The drawings are not necessarily to scale, emphasis instead being placed upon illustrating principles of the invention in a clear manner.

DESCRIPTION OF THE PREFERRED EMBODIMENT

Figure 1:
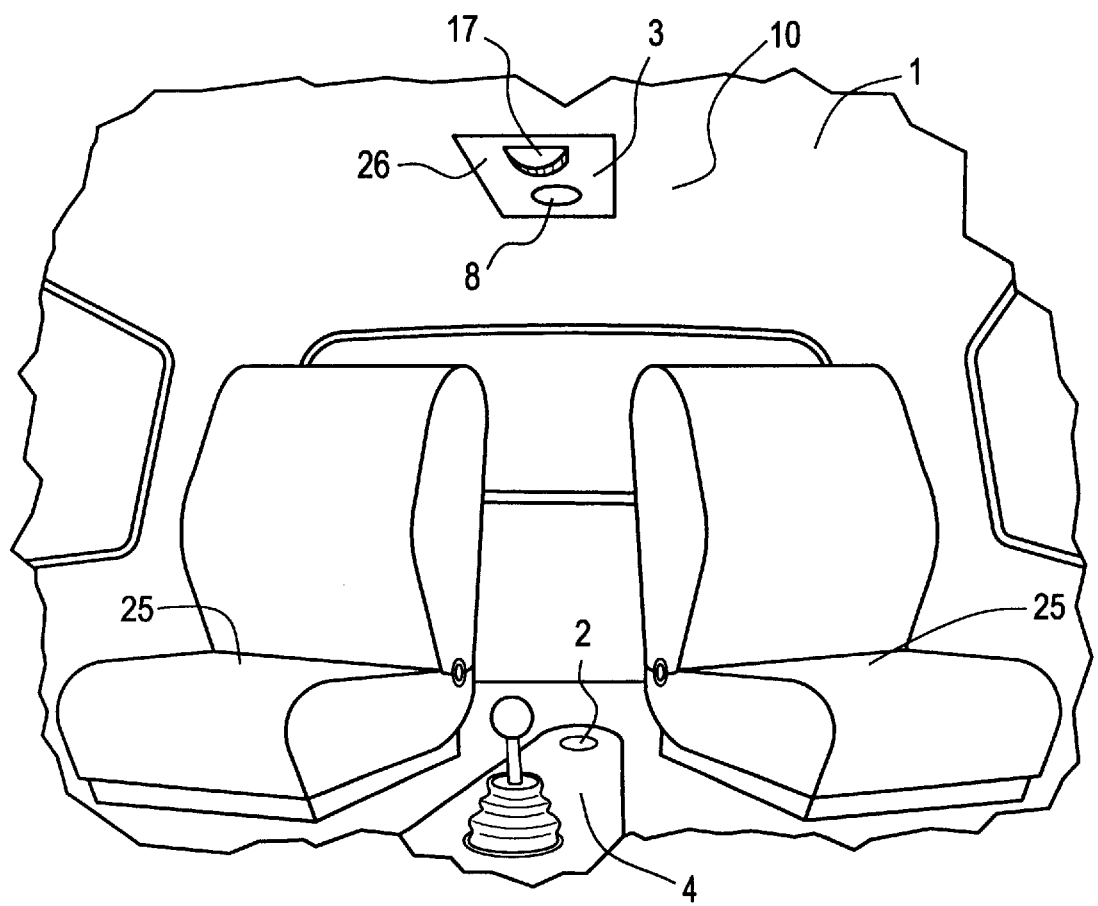
FIG. 1 shows a schematic, cutaway, perspective front view of an interior space of a vehicle having an illumination device of this invention.
Figure 2:
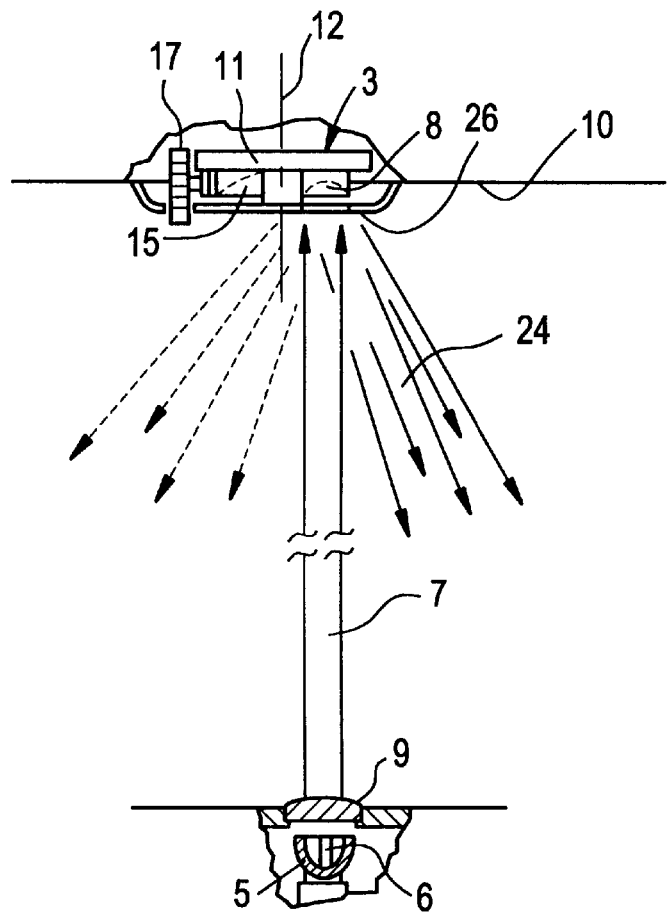
FIG. 2 shows an enlarged schematic cutaway side view of only the illumination device of FIG. 1.

An illumination device for a motor vehicle interior space 1 comprises a light source 2 and a reflector system 3.

The light source 2 is recessed into a center control panel 4 of the vehicle. The light source 2 has a lamp reflector 5, at a back (or bottom) side, facing the center control panel 4, which largely concentrates light from a lamp 6, projecting the light along an approximately parallel beam path 7 onto a reflector 8 of the reflector system 3. The front of the light source 2, opposite the back side, is covered by a transparent lamp cover 9. The lamp cover 9 can also be designed as a lens.

Figure 3:
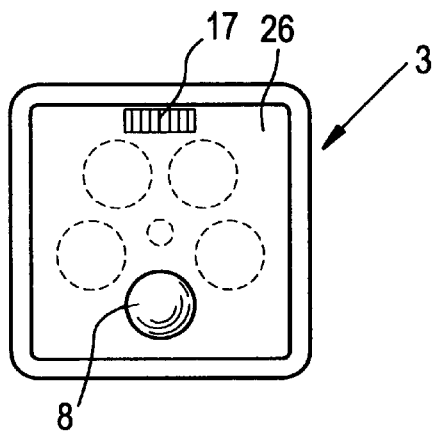
FIG. 3 shows a bottom (taken toward a side facing a light source) view of a reflector unit of the illumination device of FIG. 2.

The reflector system 3 is placed opposite the light source 2 at a vehicle inside ceiling lining 10. The reflector system 3 comprises primarily a reflector unit of a rotating disk 11 that can be rotated about its axis 12. Five reflectors 8, 13, 14, 15, 16 are placed on a side of the rotating disk 11 facing the light source 2. The rotating disk 11 can be turned using a control knob 17 located at an edge of the rotating disk 11, which is coupled via a frictional wheel or toothed gear to the rotating disk 11. However, a turning knob 18 can also be placed on the rotating disk 11 with its central axis coinciding with the rotational axis of the rotating disk 11 (FIG. 3).

According to a further embodiment, a base plate 19 capable of being displaced linearly, laterally with respect to the beam path 7 of the light source 2, is used instead of the rotating disk 11. The base plate 19 can be shoved, using a control knob 17', along two tracks 20 located along length sides of the plate.

Figure 4:
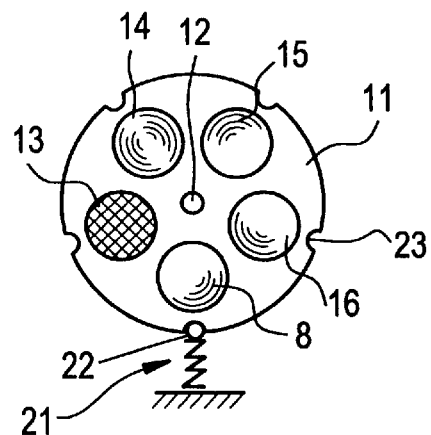
FIG. 4 shows a bottom view of a rotating disk with reflectors of the reflector unit of FIG. 3.
Figure 5:
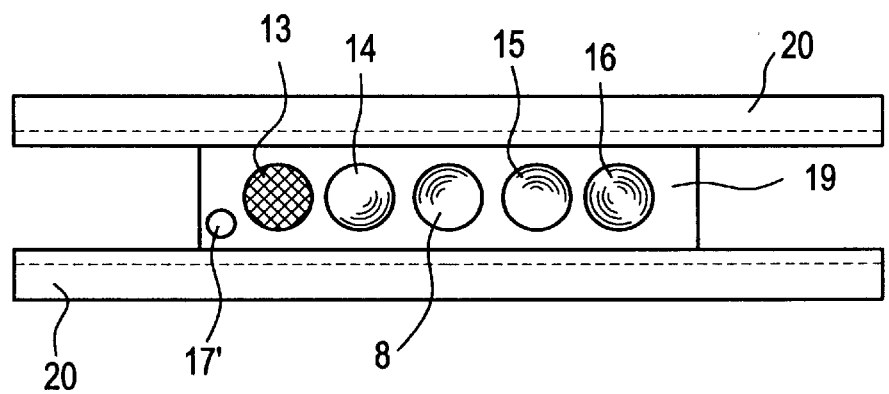
FIG. 5 shows a bottom view of a base plate with reflectors thereon that can be moved along a track in another reflector-unit embodiment of this invention.
Figure 6:
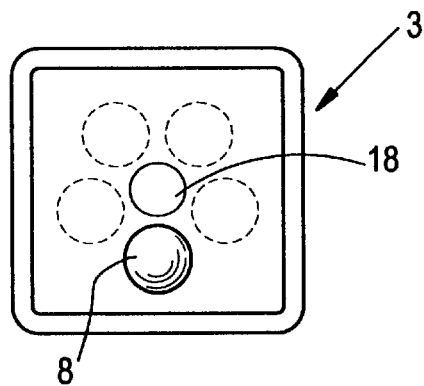
FIG. 6 shows a bottom view of yet another reflector-unit embodiment.

A snapping mechanism 21 is included with the reflector unit 3, so that a respective reflector 8, 13, 14, 15 or 16 that is brought into the beam path 7 is locked into this desired position. The snapping mechanism 21 can be constructed as a springloaded ball 22, for example, which locks into a corresponding notch 23 in the rotating disk 11 (FIG. 4) or base plate 19 (FIG. 5).

A reflector surface of the reflector 8 is designed so that it reflects incident light diffusively, providing interior lighting in the manner of an interior lamp. Reflector surfaces of other reflectors 13, 14, 15, 16 are designed for generating cones of light 24, each directed toward a seat 25 located in the interior space 1, so that the reflectors 13, 14, 15, 16 are suitable for use as reading lights. However, a reflector surface of one of the reflectors 8, 13, 14, 15, 16, can also be designed to serve as a reading light for two seats simultaneously, by dividing the surface in two, for example.

The reflector unit is covered by a cover 26 on its bottom side facing the interior space. The cover 26 is transparent in an area of the reflector 8, which, in the drawings, is shown in the beam path 7. The transparency of the cover 26 can also be achieved by use of an opening that unblocks the reflector displaced into the beam path 7. The cover 26 can also be part of the vehicle ceiling lining 10.

After a light source 2 is switched on by means of a switch (not shown), a desired reflector 8, 13, 14, 15, 16 is brought into the beam path 7 at the transparent area by means of the control knob 17, 17' until it is locked into this predetermined position.

An advantage of an illumination device of this type is that a single light source can be used for multiple functions. To perform the various individual functions, it is sufficient for an appropriate reflector to be brought into the beam path of the light source. An illumination device of this type can be used economically for multipurpose illumination of interior spaces.

In the depicted advantageous embodiments of the invention, the light source is placed vertically in a lower area of the interior space of the vehicle, on the center control panel of a compact car for example. The beam path of light emanating from the light source, being an approximately parallel beam, is directed in an approximately vertical direction upwardly toward the vehicle ceiling, striking the reflector which has been moved into this beam path, and light is then deflected into the space in a manner dependent upon a surface configuration of the reflector. A reflector generating diffused light is used for interior space lighting, for example, and a reflector emitting a cone of light directed to a specific seat is used as a reading light for that seat. Multiple reflectors are arranged on the rotating disk so that by turning the rotating disk, reflectors are respectively moved into the beam path of light from the light source. However, reflectors may also be placed in a linear series on a base plate capable of being moved laterally.

Although in the described embodiments the interior space is actually illuminated from above, no electrical wiring is required along the vehicle inside roof lining. The light source is placed in an area already equipped with electrical wiring. Wiring costs are decreased significantly, and an economical yet flexible solution for illuminating the interior space is achieved.

According to a further advantageous design, the reflector unit is covered by a cover facing the interior space, the cover being transparent only where a reflector is brought into the beam path. In this manner, the reflectors are protected, do not become soiled, and are not damaged when the vehicle ceiling lining is cleaned.

While the invention has been particularly shown and described with reference to a preferred embodiment, it will be understood by those skilled in the art that various changes in form and detail may be made therein without departing from the spirit and scope of the invention.

The invention claimed is:

1. An illumination device for illuminating an interior space of a motor vehicle having a light source for transmitting a beam of light and an opposing reflector means for receiving said beam of light from the light source and reflecting it, said reflector means being located a distance from the light source across the interior space of the motor vehicle, wherein the reflector means includes a reflector unit having multiple separate reflectors and said reflector means further includes a reflector positioning means for individually bringing each reflector of said reflector unit into a beam path of the beam of light from the light source.

2. An illumination device as in claim 1, wherein the light source is placed in a vertically lower area of the interior space.

3. An illumination device as in claim 2, wherein the light source is located at a center control panel of said motor vehicle.

4. An illumination device as in claim 1, wherein the reflector unit is placed in a vertically upper area of the interior space.

5. An illumination device as in claim 4, wherein the reflector unit is placed on a vehicle ceiling opposite a center control panel of said motor vehicle.

6. An illumination device as in claim 1, wherein the reflector unit includes a rotating disk on which multiple reflectors are arranged in a circle.

7. An illumination device as in claim 6, wherein said reflector means further includes a control knob for rotating the rotating disk.

8. An illumination device as in claim 6, wherein the reflector means includes a means for locking the rotating disk into positions in which respective reflectors are in the beam path.

9. An illumination device as in claim 1, wherein the reflector unit includes a base plate which is linearly movable, laterally with respect to the beam of light from the light source, on which multiple reflectors are placed.

10. An illumination device as in claim 9, wherein the base plate can be displaced by means of a control knob.

11. An illumination device as in claim 9, wherein the reflector means includes a means for locking the base plate in a position in which a respective reflector is located in the beam of light from the light source.

12. An illumination device as in claim 1, wherein the reflector means includes a cover for covering a side of the reflector unit facing the interior space for allowing transmission of light therethrough in an area where a reflector is brought into the beam of light from the light source.

13. An illumination device as in claim 12, wherein the cover has an opening in the area where the reflector is brought into the beam of light to unblock the reflector.

14. An illumination device as in claim 1, wherein at least one of the reflectors diffusively reflects incident light as space lighting.

15. An illumination device as in claim 1, wherein at least one of the reflectors is for providing reading light for one seat.

16. An illumination device as in claim 15, wherein additional reflectors are for providing reading light for other seats.

17. An illumination device as in claim 1, wherein one of the reflectors is for providing reading light for two seats.

18. An illumination device as in claim 1, wherein the beam of light is a substantially parallel beam substantially only directed toward an area at which the respective reflectors are unblocked.

19. An illumination device as in claim 1, wherein said light source includes a focusing lens positioned in front of a lamp.

20. An illumination device as in claim 1, wherein the light source includes a lamp and a reflector for concentrating light from the lamp.

21. An illumination device as in claim 1, wherein said illumination device is mounted in a vehicle interior for providing multipurpose interior lighting for the vehicle.

22. An illumination device as in claim 13, wherein a vehicle inside roof lining serves as the cover.

23. An illumination device for illuminating an interior space of a motor vehicle having a light source for transmitting a beam of light and an opposing reflector means for receiving said beam of light from the light source and reflecting it, said reflector means being located a distance from the light source across the interior space, wherein the reflector means includes a reflector unit having multiple reflectors and said reflector means further includes a reflector positioning means for bringing each reflector of said reflector unit into a beam path of the beam of light from the light source; wherein the reflector unit includes a rotating disk on which multiple reflectors are arranged in a circle.

24. An illumination device as in claim 23, wherein said reflector means further includes a control knob for rotating the rotating disk.

25. An illumination device as in claim 23, wherein the reflector means includes a means for locking the rotating disk into positions in which respective reflectors are in the beam path.

26. An illumination device for illuminating an interior space of a motor vehicle having a light source for transmitting a beam of light and an opposing reflector means for receiving said beam of light from the light source and reflecting it, said reflector means being located a distance from the light source across the interior space, wherein the reflector means includes a reflector unit having multiple reflectors and said reflector means further includes a reflector positioning means for bringing each reflector of said reflector unit into a beam path of the beam of light from the light source; wherein the reflector unit includes a base plate which is linearly movable, laterally with respect to the beam of light from the light source, on which multiple reflectors are placed.

27. An illumination device as in claim 26, wherein the base plate can be displaced by means of a control knob.

28. An illumination device as in claim 26, wherein the reflector means includes a means for locking the base plate in a position in which a respective reflector is located in the beam of light from the light source.

\* \* \* \* \*